M. J. GRÉMILLET.
LOCKING DEVICE FOR MOTOR CARS OR OTHER VEHICLES.
APPLICATION FILED MAY 21, 1913.

1,106,556.  
Patented Aug. 11, 1914.

Witnesses

Inventor

UNITED STATES PATENT OFFICE.

MARIE JOSEPH GRÉMILLET, OF BEZONS, FRANCE, ASSIGNOR TO FELIX MASSARD, OF PARIS, FRANCE.

LOCKING DEVICE FOR MOTOR-CARS OR OTHER VEHICLES.

1,106,556.   Specification of Letters Patent.   Patented Aug. 11, 1914.

Application filed May 21, 1913.   Serial No. 769,040.

*To all whom it may concern:*

Be it known that I, MARIE JOSEPH GRÉMILLET, a citizen of the Republic of France, residing at No. 48 Rue des Bois, Bezons, Seine-et-Oise, France, have invented certain new and useful Improvements in Locking Devices for Motor-Cars or other Vehicles, of which the following is a specification.

This invention relates to locking devices for motor-cars or other vehicles and has for its object to provide a locking device comprising a support secured to an axle in proximity to a wheel and carrying a pivot around which a lever can be swung so as to be brought into engagement with the spokes of the wheel, said lever being maintained in its locking position by means of a sliding bolt which is located in a socket forming part of or secured to the support and is pushed by means of a spring so that its end engages with a recess provided in the hub of the locking lever, said sliding bolt being disengaged from the hub recess by means of a tubular key so shaped that it can be inserted into the socket surrounding the sliding bolt and brought to engage with the other end or head of the sliding bolt so as to permit of the latter being pulled out of the recess in the lever hub.

This locking device is preferably used in combination with a cut-out arranged in the electrical ignition circuit of the motor and controlled by the locking device in such a manner that the electrical circuit is opened when the lever is lowered into its locking position, it being well understood that the aforesaid combination may be carried into practice in any suitable manner.

The invention will now be described with reference to the drawings.

Figure 2:
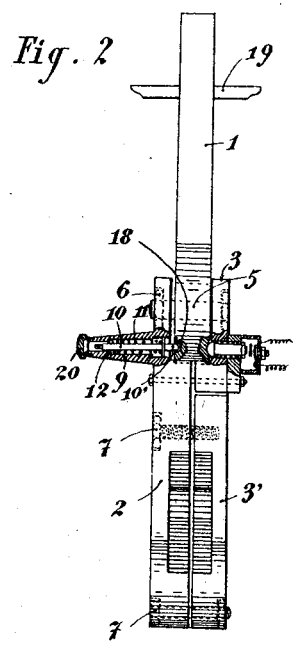
Figure 1:
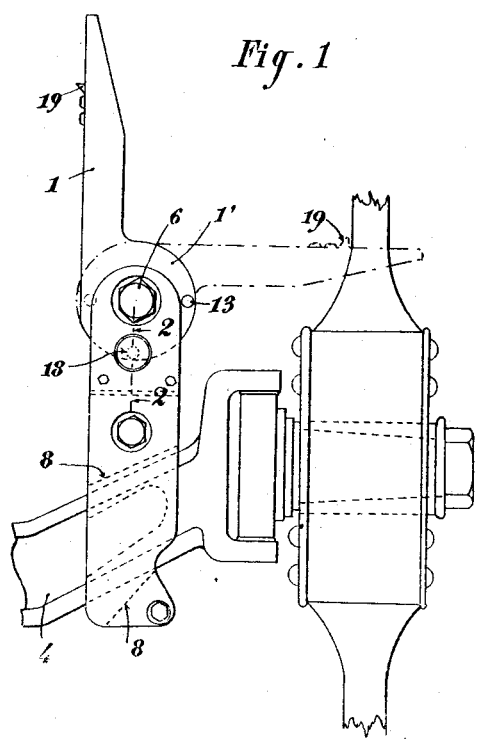
Figure 3:
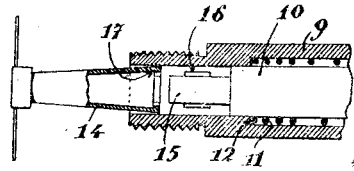
Figure 4:
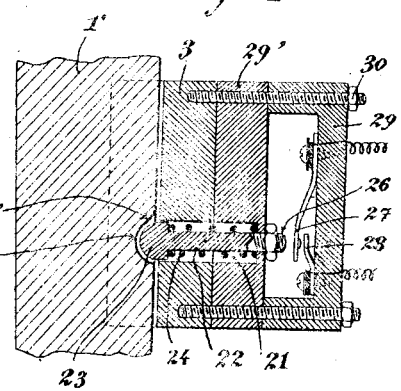

Figure 1 shows the locking apparatus secured to the front axle of a motor car; Fig. 2 is a side view with part section on line 2—2 (Fig. 1); Figs. 3 and 4 are detail views showing the sliding bolt maintaining the lever in its locking position and the ignition circuit controlling device, respectively.

The locking arm 1 is pivotally supported between two cheeks or plates inclosing the axle 4. The plate 2 carries the pivot 5 for the locking lever 1. The other plate is made of two parts; the upper part 3 being fixed to the plate 2 by means of the pivot itself which is bolted with a nut 6 countersunk so as to require a special tube wrench for its dismounting. This upper part 3 is spaced a fixed distance from the plate 2 so as to allow of the free swinging motion of the arm 1, whereas the lower part 3′, secured to the plate 2 by means of bolts 7 which are also provided with countersunk heads, can be separated more or less from the plate 2 so as to allow of the apparatus being mounted upon axles of various widths. The grooves 8 provided in the inner face of the plates 2, 3′ to receive the flanges of the I iron forming the axle 4 are of sufficient width to permit the mounting of the locking device upon axles of various heights.

One of the supporting plates, preferably the plate 2 which is toward the front of the car is perforated throughout and carries a socket 9 formed with or secured to the plate and in which is located and guided a sliding bolt 10 which is permanently pushed toward the swinging lever by means of a spring 11 bearing on an inner shoulder 12 of the socket 9 and engaging with a collar on the bolt 10. In the locking position, *i. e.* that shown in dotted lines Fig. 1, the point 10′ of the bolt 10 enters a corresponding recess 13 provided in the hub of the lever 1, the latter being thus firmly held in its locking position. The sliding bolt 10 is hidden in the socket 9 so that it cannot be taken out by means of a pliers or similar tool but adjacent its outer end it is reduced in diameter so as to permit the insertion between said bolt and socket of a special tube 14 which constitutes the key of the lock thus formed. To that end the head 15 of the sliding bolt is provided (Fig. 3) with teeth 16 (or notches or other equivalent means) which can be brought to engage with corresponding teeth or shoulders 17 provided at the end of the key 14 so as to permit of hooking the head 15 with said key and then to pull the sliding bolt out of its recess 13 against the spring 11. When the bolt 10 is thus disengaged the locking lever 1 can be lifted by hand out of engagement with the wheel spokes and be brought back into the vertical position termed the "off-position" (shown in full lines, Figs. 1 and 2) in which it can be held by permitting the point 10′ to engage with another recess 18 of the lever 1. This is effected simply by withdrawing the key 14, thus releasing the sliding bolt 10 which, being pushed by its spring, enters into the recess 18 and maintains the lever in the " off-position."

In order to lock the steering mechanism of the car when locking the wheels, as above described, a bar 19 has been provided which is transversely fixed to the lever 1 at such a distance from the pivot that it is brought to bear against the spokes on the inner face of the wheel when the lever 1 is in the position shown in dotted lines in Fig. 1.

It will be readily understood that the head of the sliding bolt 10 which is provided with teeth or notches and is used as a lock in connection with the corresponding key 14 will in practice be differently built for each apparatus, in the manner of safety locks, so as to prevent the possibility of opening the locking device with the key of another car. The outer end of the socket 9 is preferably threaded to receive a cap 20 for preventing the lock from being clogged by impurities.

The ignition circuit controlling device is designed in the following manner: In a hole 21 provided (Figs. 2 and 4) in the plate 3 a sliding pin is located whose round head 23 is constantly pushed by a spring 24 against the hub 1' and which, when the arm 1 occupies the locking position, enters a recess 25 provided in the hub 1'. But when the arm is lifted up to the "off-position" the head 23 is pushed back out of the recess 25 by means of an inclined surface 25' so that the opposite end 26 of the pin 22 is brought to establish a contact between two contact springs 27, 28 of the ignition circuit, thus closing a gap in the ignition circuit of the motor. The contact springs 27, 28 insulated in any suitable manner are mounted for instance on the inner face of a cover 29 made of insulating material and secured by means of screw or the like 30 to a plate 29' fixed to the plate.

It will be readily understood that the ignition circuit which was disconnected when the lever occupied the locking position cannot be again switched in unless the lever be lifted up to the " off-position"; it follows that the motor cannot be started while the locking lever is in the locking position between the spokes of the wheel which might otherwise result in serious mishaps.

What I claim and desire to secure by Letters Patent of the United States is:—

1. The combination with a wheeled vehicle, of an arm adjustably supported on a relatively stationary part of the vehicle and movable to and from a position to engage one of the vehicle wheels and prevent rotation thereof, a concealed bolt acting to lock the arm in operative position, and a detachable device for releasing the bolt.

2. The combination with a wheeled vehicle, of an arm pivotally mounted on a relatively fixed support adjacent one of the vehicle wheels, whereby the arm may be turned to and from a position where it will project between spokes of the wheel, a concealed bolt arranged to automatically engage the arm at the end of its movement in either direction, and a detachable device for releasing the bolt.

3. The combination with a wheeled vehicle, of an arm adjustably mounted on a relatively stationary support adjacent one of the steering wheels of the vehicle, whereby the arm may be moved to and from a position where it will project between spokes of the wheel, means on said arm adapted to prevent the wheel from turning about an axis transverse to its horizontal axis when the arm is in operative position, a concealed bolt acting to lock said arm in operative position, and a detachable device for releasing the bolt.

4. The combination with a wheeled vehicle, of an arm adjustably mounted on a relatively stationary support adjacent one of the steering wheels of the vehicle, whereby the arm may be moved to and from a position where it will project between spokes of the wheel, lateral projections on said arm adapted to extend over the adjacent faces of the spokes between which the arm extends when in operative position, a concealed bolt for locking the arm in operative position, and a detachable device for releasing the bolt.

5. The combination with a motor vehicle, of an arm adjustably supported on a relatively stationary part of the vehicle and movable to and from a position to engage one of the vehicle wheels and prevent rotation thereof, an adjustable electric circuit controlling device adapted to break the circuit when the arm is engaging the wheel and to close said break when the arm is moved from operative position, a concealed bolt acting to lock the arm in operative position, and a detachable device for releasing the bolt.

6. The combination with a motor vehicle, of an arm adjustably supported on a relatively stationary part of the vehicle and movable to and from a position to engage one of the steering wheels of the vehicle to prevent rotation thereof or movement about an axis transverse to the axis of rotation, an adjustable electric circuit controlling device adapted to break the circuit when the arm is engaging the wheel and to close said break when the arm is moved from operative position, a concealed bolt acting to lock the arm in operative position, and a detachable device for releasing the bolt.

7. The combination with a wheeled vehicle, of a support mounted on an axle of the vehicle and comprising two plates adjustably connected so that they may be securely engaged with axles of different sizes, an arm pivotally mounted on said support so that it may be turned to and from a position between spokes of a wheel on the axle, a concealed bolt acting to lock the arm at the end of its movement in either direction, and a detachable device for releasing the bolt.

In testimony whereof, I have hereunto subscribed my name this ninth day of May 1913.

MARIE JOSEPH GRÉMILLET.

Witnesses:
 MAURICE DEGRON,
 LUCIEN MEMMINGER.